US011962679B2

(12) United States Patent
Polyakov et al.

(10) Patent No.: US 11,962,679 B2
(45) Date of Patent: Apr. 16, 2024

(54) SECURE DISTRIBUTED KEY GENERATION FOR MULTIPARTY HOMOMORPHIC ENCRYPTION

(71) Applicant: Duality Technologies, Inc., Maplewood, NJ (US)

(72) Inventors: Yuriy Polyakov, Fair Lawn, NJ (US); Vinod Vaikuntanathan, Boston, MA (US)

(73) Assignee: Duality Technologies, Inc., Maplewood, NJ (US)

( * ) Notice: Subject to any disclaimer, the term of this patent is extended or adjusted under 35 U.S.C. 154(b) by 0 days.

(21) Appl. No.: 17/340,381

(22) Filed: Jun. 7, 2021

(65) Prior Publication Data

US 2021/0399874 A1    Dec. 23, 2021

Related U.S. Application Data

(60) Provisional application No. 63/041,280, filed on Jun. 19, 2020.

(51) Int. Cl.
*H04L 9/00* (2022.01)
*H04L 9/08* (2006.01)
*H04L 9/30* (2006.01)

(52) U.S. Cl.
CPC .............. *H04L 9/008* (2013.01); *H04L 9/085* (2013.01); *H04L 9/30* (2013.01); *H04L 2209/46* (2013.01)

(58) Field of Classification Search
None
See application file for complete search history.

(56) References Cited

U.S. PATENT DOCUMENTS 10,581,812 B2 * 3/2020 Rohloff ............... H04L 63/0442
11,394,525 B2 * 7/2022 Georgieva ........... H04L 9/3013
(Continued)

OTHER PUBLICATIONS

Hao Chen and Wei Dai and Miran Kim and Yongsoo Song; Efficient Multi-Key Homomorphic Encryption with Packed Ciphertexts with Application to Oblivious Neural Network Inference; 2019; https://dl.acm.org/doi/pdf/10.1145/3319535.3363207 (Year: 2019).*
(Continued)

*Primary Examiner* — Saleh Najjar
*Assistant Examiner* — Shadi H Kobrosli
(74) *Attorney, Agent, or Firm* — PEARL COHEN ZEDEK LATZER BARATZ LLP

(57) ABSTRACT

Collaborative multiparty homomorphic encryption comprising receiving a linear common public key collaboratively generated by a plurality of parties as a sum of linear public key shares associated with the respective plurality of parties. Each of two ciphertexts may be encrypted with the linear common public key and the two ciphertexts may be combined by a non-linear computation to generate a result ciphertext encrypted by a non-linear public key. The result ciphertext may be re-encrypted with a re-linearization key to swap encryption keys from the non-linear public key to a linear public key. The re-encrypted result ciphertext may be distributed to the plurality of parties to each partially decrypt the re-encrypted result ciphertext by a linear secret key share associated with the party, which in combination fully decrypts the result by a linear common secret key that is a sum of the secret key shares of the respective plurality of parties.

20 Claims, 3 Drawing Sheets

(56) References Cited

U.S. PATENT DOCUMENTS

| | | | | |
|---|---|---|---|---|
| 2008/0059787 | A1* | 3/2008 | Hohenberger | H04L 9/3073 713/153 |
| 2013/0170640 | A1* | 7/2013 | Gentry | H04L 9/008 380/30 |
| 2017/0147835 | A1* | 5/2017 | Bacon | H04L 9/008 |
| 2018/0375639 | A1* | 12/2018 | Lauter | H04L 9/008 |
| 2018/0375640 | A1* | 12/2018 | Laine | H04L 9/008 |
| 2021/0248176 | A1* | 8/2021 | Pankanti | H04L 9/008 |

OTHER PUBLICATIONS

Christian Mouchet and Juan Troncoso-Pastoriza and Jean-Pierre Hubaux; Multiparty Homomorphic Encryption: From Theory to Practice; Mar. 2020; https://eprint.iacr.org/archive/2020/304/1584025574.pdf (Year: 2020).*

Kim Laine; Simple Encrypted Arithmetic Library 2.3.1; 2017; https://www.microsoft.com/en-us/research/uploads/prod/2017/11/sealmanual-2-3-1.pdf (Year: 2017).*

Adriana López-Alt, Eran Tromer, and Vinod Vaikuntanathan. 2012. On-the-fly multiparty computation on the cloud via multikey fully homomorphic encryption. 1219-1234. https://doi.org/10.1145/2213977.2214086 (Year: 2012).*

Asharov G., Jain A., López-Alt A., Tromer E., Vaikuntanathan V., Wichs D. (2012) Multiparty Computation with Low Communication, Computation and Interaction via Threshold FHE. In: Pointcheval D., Johansson T. (eds) Advances in Cryptology—Eurocrypt 2012. Eurocrypt 2012. Lecture Notes in Computer Science, vol. 7237. Springer, Berlin, Heidelberg.

Bajard, J.C., Eynard, J., Hasan, M.A., Zucca, V.: A full RNS variant of FV like somewhat homomorphic encryption schemes. In: SAC 2016. pp. 423-442 (2017).

Brakerski, Z., Gentry, C., Vaikuntanathan, V.: (Leveled) Fully Homomorphic Encryption without Bootstrapping. In: ITCS '12. pp. 309-325 (2012).

Z. Brakerski. Fully Homomorphic Encryption without Modulus Switching from Classical GapSVP. In CRYPTO 2012. pp. 868-886 (2012).

Brakerski, Z., Vaikuntanathan, V.: Efficient Fully Homomorphic Encryption from (Standard) LWE. In: FOCS '11. pp. 97-106 (2011).

J. H. Cheon, A. Kim, M. Kim, Y. Song, Homomorphic Encryption for Arithmetic of Approximate Numbers. In Asiacrypt 2017. pp. 409-437.

J. Fan and F. Vercauteren. Somewhat Practical Fully Homomorphic Encryption. Cryptology ePrint Archive. Report 2012/144, 2012. http://eprint.iacr.org/2012/144.

K. Han, D. Ki, Better Bootstrapping for Approximate Homomorphic Encryption. In CT-RSA 2020. pp. 364-390.

L'opez-Alt, A., Tromer, E., Vaikuntanathan, V.: Cloud-assisted multiparty computation from fully homomorphic encryption. Cryptology ePrint Archive, Report 2011/663 (2011). https://eprint.iacr.org/2011/663.

* cited by examiner

SECURE DISTRIBUTED KEY GENERATION FOR MULTIPARTY HOMOMORPHIC ENCRYPTION

CROSS-REFERENCE TO RELATED APPLICATIONS

This application claims the benefit of U.S. Provisional Patent Application Ser. No. 63/041,280, filed on Jun. 19, 2020, which is hereby incorporated by reference in its entirety.

FIELD OF THE INVENTION

Embodiments of the invention are directed to Homomorphic encryption, decryption, and security.

BACKGROUND OF THE INVENTION

Threshold Fully Homomorphic Encryption (FHE) is a secure multiparty computation protocol where all parties interact to generate a common public key and a common secret key. Each party has a secret key share and a corresponding public key share. Linear key shares are used for their linear additive property so that the common public key is equal to the sum of the public key shares of the multiple parties and the common secret key is equal to the sum of the secret key shares of the multiple parties. The common public key may thus be generated collaboratively by the multiple parties, where each party individually and sequentially adds its public key share, which is cumulatively equivalent to complete common public key. The common public key may then be shared with all parties and used to encrypt data as ciphertexts. Computations may be performed on the encrypted data (ciphertexts) using FHE. An encrypted computational result may be decrypted using a similar interactive procedure where all parties collaborate, each party contributing a partial decryption using its secret key share, until the entire result is decrypted. Thus, the underlying complete secret key is never revealed to any individual party.

Though each common public key may be linear, when ciphertexts are multiplied, so are their keys, resulting in squared (one multiplication) or higher-order (multiple multiplications) non-linear encryption. In an example of threshold FHE, each ciphertext is encrypted by the sum of multiple parties' public key shares, so when two ciphertexts are multiplied, the result is encrypted by a public key corresponding to the square of the sum of the secret key shares. This public key corresponds to a non-linear (squared) secret key that does not have the linear additive property that allows private key shares to be added to collaboratively decrypt piecewise by their respective parties. Instead, decryption of this non-linear encryption can only be performed using a non-linear decryption key, e.g., the square of the sum of the multiple parties' secret key shares. However, generating this non-linear decryption key (e.g., squaring the sum of secret key shares) requires combining the multiple parties' secret key shares (e.g., in order to square the combination of keys), so one or more parties have to share their secret key shares and the complete secret key is exposed to at least one party, thereby obviating its secrecy and rendering it useless.

Accordingly, there is a need in the art for secure collaborative key generation techniques that support multiplication within a collaborative multiparty computational protocol such as threshold FHE.

SUMMARY OF EMBODIMENTS OF THE INVENTION

In some embodiments of the invention, a device, system and method is provided for collaborative multiparty homomorphic encryption. A linear common public key may be received that is collaboratively generated by a plurality of parties each contributing a linear public key share associated with the party, which in combination with linear public key shares associated with each of the other parties, generates the linear common public key that is a sum of the linear public key shares associated with the respective plurality of parties. Each of two ciphertexts may be encrypted with the linear common public key. The two ciphertexts may be combined by a non-linear computation to generate a result ciphertext encrypted by a higher order non-linear public key. The result ciphertext may be re-encrypted with a re-linearization key to swap encryption keys from the non-linear public key to a linear public key. The re-encrypted result ciphertext may be distributed to the plurality of parties to each partially decrypt the re-encrypted result ciphertext by a linear secret key share associated with the party, which in combination with partial decryptions of the re-encrypted result ciphertext by each of the other parties, fully decrypts the result by a linear common secret key that is a sum of the secret key shares of the respective plurality of parties. Thus the initial result ciphertext encrypted by the non-linear public key, which would require decryption by a non-linear common secret key that could only be generated by exposing the linear common secret key, is transformed to the re-encrypted result ciphertext encrypted by the linear public key, which is decrypted collaboratively by each party independently partially decrypting with their respective secret key share so as not to expose the full linear common secret key. Such embodiments of the invention provide secure collaborative key generation techniques that support multiplication under threshold FHE.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
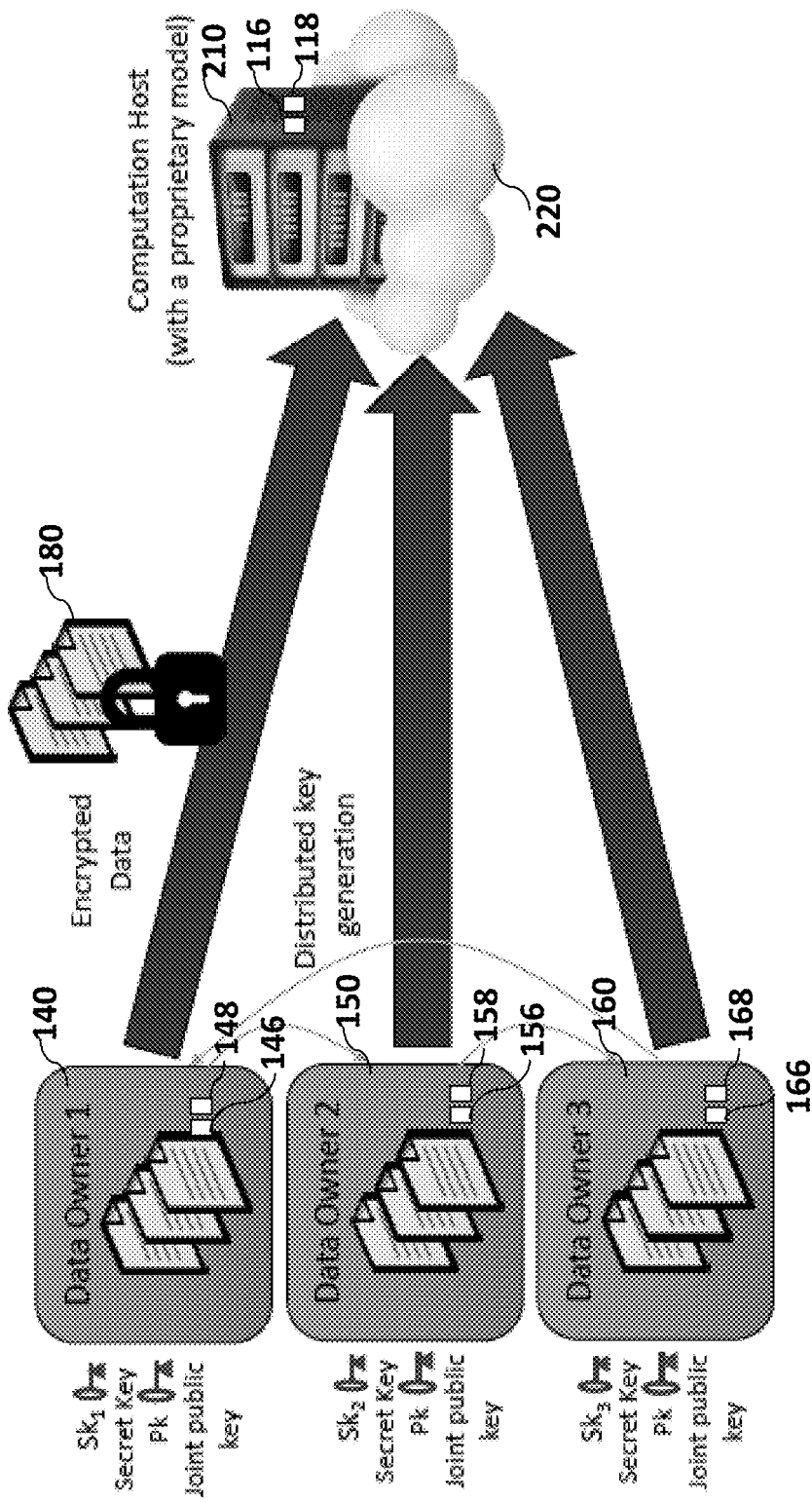
FIG. 1 schematically illustrates a system for secure distributed key generation and collaborative decryption under threshold fully homomorphic encryption with multiple data owners, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

Multiplying ciphertexts using a FHE protocol raises ciphertext keys from a linear space to a higher-order non-linear space. For example, two ciphertexts each encrypted by a linear key represented by a polynomial of order 1 multiply to yield a product ciphertext that is encrypted by a non-linear key represented by a polynomial of order 2. Decrypting a computation result encrypted by a non-linear encryption key conventionally requires decryption by a corresponding non-linear decryption key, e.g., a square of a sum of multiple parties' secret key shares. Generating such a square of sum of multiple parties' secret key shares requires sharing the secret key shares in order to square them, which exposes the common secret key thereby vitiating the system's security.

To overcome aforementioned problems inherent in the art, embodiments of the invention provide a new FHE technique of key re-linearization that projects ciphertexts encrypted by higher-order non-linear keys (e.g., a square of a sum of secret key shares) to ciphertexts encrypted by linear keys (e.g., a sum of secret key shares). Key re-linearization may undo the non-linearization of keys caused by multiplication in FHE space. For example, whereas multiplying ciphertexts raises their polynomial key dimension from linear order to a higher non-linear order, key re-linearization may reduce the polynomial key dimension of the product back from non-linear to linear order, while preserving the product result. Once the linear dimension of the ciphertext key is restored, so too are its linear additive properties of its public and secret key shares. In particular, the common secret key is equivalent to the sum of the secret key shares of the multiple parties. The re-linearized ciphertext product may thus be decrypted collaboratively by each party individually and sequentially contributing a partial decryption using their respective secret key shares, until the entire result is decrypted. With the re-linearized key, no secret key shares have to be combined as with a non-linear secret key. Thus, parties do not have to share their secret key share with any other party, so the common secret key is never revealed to any party. Embodiments of the invention thereby improve security by providing collaborative key generation techniques that supports multiplication without exposing the common secret decryption key.

In threshold FHE, the common public key for multiple parties is a linear key generated by summing up the multiple parties' respective public key share. For example, each jth party with a secret share $s_j$ may generate a corresponding public key share $pk_j = as_j + e_j$, where all parameters may be e.g., cyclotomic ring elements, such as in $Z_q[x]/(x^n+1)$, where q is a modulus, n is a power-of-two ring dimension, a is a uniform ring element, $s_i$ is a uniform (typically ternary) ring element, and $e_i$ is a Gaussian error ring element. The common public key is $pk=(\alpha, \Sigma_j pk_j)$. Threshold FHE ring constructions may use this procedure for generating a common public key. Similarly, in threshold FHE, the common secret key for multiple parties is a linear key generated by summing up the multiple parties' respective secret key shares such that $s=\Sigma_j s_j$.

When two ciphertexts $(c_0, c_1)$ and $(c_0', c_1')$ each encrypted by the linear common public key pk (e.g., $(c_0, c_1)=c_0+sc_1+e_j$ and $(c_0', c_1')=c_0'+sc_1'+e_j$) are combined by a non-linear (non-additive) computation, such as, multiplication, the result ciphertext is encrypted by a non-linear common public key (e.g., as $(c_0^*, c_1^*, c_2^*)=c_0^*+sc_1^*+s^2c_2^*=c_0(c_0'+sc_1'+e_j)+sc_1(c_0'+sc_1'+e_j)+e_j(c_0'+sc_1'+e_j)$), which includes a non-linear square of the key (e.g., $s^2c_2^*=s^2(c_1c_1')$). Because the common secret key in threshold FHE is the sum of secret key share $(\Sigma_j s_j)^2(c_1c_1')$, this result ciphertext includes the square of the sum of secret key shares $(\Sigma_j s_j)^2(c_1c_1')$. This non-linear common public key thus cannot be generated without obtaining the common secret key $\Sigma_j s_j$, thereby vitiating its security.

To solve this problem, embodiments of the invention provide a re-linearization key (c,d) to re-encrypt the non-linear encrypted result ciphertext to swap keys from the above non-linear common public key associated with non-linear common secret key $(\Sigma_j s_j)^2$ back to a linear public key (e.g., generally different than pk) associated with linear common secret key $\Sigma_j s_j$. The re-linearization key (c,d) may be generated interactively by the multiple parties in the system, e.g., according to the following sequence of steps. For simplicity, generating the re-linearization key (c,d) is first described in a system with j=two parties A and B, and then generalized to any number of j parties. In a two-party system, party A possesses secret key share $s_A$ and party B possesses secret key share $s_B$. A common secret key s may comprise the summation of the parties' respective secret key shares such that $s=\Sigma_j s_j = s_A + s_B$. To generate the re-linearization key (c,d), party A and party B may interactively perform the following sequence of steps.

Round 0: Parties A and/or B may generate vector a of uniform random elements $a_i$ for i=0 ... log q, where r is the digit bit size and q is the ciphertext modulus. Parties A and/or B may use a cryptographically secure hash function to generate a.

Round 1—Executed by Party A: Party A samples its secret key share $s_A$, and Gaussian error ring element $e_{Ai}$ for i=q to generate its public key share $pk_A = as_A + e_A$ with elements $pk_{Ai} = a_i s_A + e_{Ai}$. Party A may apply its public key share $pk_A$ to a secret share multiplied by tar to generate a partial encryption vector $b_A$ with components, e.g., $b_{Ai} = pk_{Ai} + 2^{ir} s_A = a_i s_A + e_{Ai} + 2^{ir} s_A$ f$_{or}$ i$=_q$. Partial encryption vector $b_A$ represents a partial encryption of $2^{ir} s_A$ under the party's public key share $pk_A$ associated with the party's secret key share $s_A$. Party A may send the partially encryption vector $b_A$ to party B.

Round 2—Executed by Party B: Party B first performs the same steps as party A in Round 1 using its secret key share $s_B$. Party B samples its secret key share $s_B$, and Gaussian error ring element $e_{Bi}$ for i=q to generate its public key share $pk_B = as_B + e_B$ with elements $pk_{Bi} = a_i s_B + e_{Bi}$. Party B may apply its public key share $pk_B$ to a secret share multiplied by tar to generate another partial encryption vector $b_B$ with components, e.g., $b_{Bi} = pk_{Bi} + 2^{ir} s_B = a_i s_B + e_{Bi} + 2^{ir} s_B$ for i=log$_r$ q. Partial encryption vector $b_B$ represents a partial encryption of $2^{ir} s_B$ under the party's public key share $pk_B$ associated with the party's secret key share $s_B$. Party B, party A or another third party may then combine party A and B's partially encryption vectors to generate a common encrypted ciphertext vector $b = b_i = b_A + b_B$, which may comprise components $b_i = a_i(s_A + s_B) + e_{Ai} + e_{Bi} + 2^{ir}(s_A + s_B) = pk_i + 2^{ir} s$. A common encryption operator or matrix $(a,b)=(a, b_A + b_B)=(a, a(s_A + s_B) + e_A + e_B + 2^{ir}(s_A + s_B))$ may be generated that represents the encryption of the data $2^{ir}(s_A + s_B)$ under the common public key $pk = a(s_A + s_B) + e_A + e_B$ associated with the common secret key $s = s_A + s_B$.

User B may compute a partial re-linearization operator or vector $(c_B, d_B)$ composed e.g., of pairs $(c_{Bi}, d_{Bi}):=(a_i s_B + f_{Bi}, b_i s_B + f_{Bi}')=(a_i s_B + f_{Bi}, a_i(s_A + s_B)s_B + (e_{Ai} + e_{Bi})s_B + 2^{ir}(s_A + s_B)s_B + f_{Bi}')$. $f_{Bi}, f_{Bi}'$ may be error ring elements generated using a Gaussian distribution, which are added to use Ring Learning With Errors (LWE) hardness. Accordingly, partial re-linearization vector $(c_B, d_B) = (a_i, a_i(s_A+s_B)+(e_{Ai}+e_{Bi})+2^{ir}(s_A+s_B)s_B)$, which corresponds to an encryption of $2^{ir}(s_A+s_B)s_B$ under the common public key $pk = a(s_A+s_B)+e_A+e_B$ associated with the common secret key $s=s_A+s_B$. After removing a factor of $s_B$ from the key, Party B may send the complete encrypted ciphertext vector b and the partially re-linearization vector $(c_B, d_B)$ to party A.

Round 3—Executed by Party A: Party A computes its own partial re-linearization vector $(c_A, d_A)$ using its secret key share $s_A$. Party A's partial re-linearization vector $(c_A, d_A)$ may be composed of pairs $(c_{Ai}, d_{Ai}) = a_i s_A + f_{Ai}, b_i s_A + f'_{Ai}) = (a_i s_A + f_{Ai}, a_i(s_A+s_B)s_A (e_{Ai}+e_{Bi})s_A + 2^{ir}(s_A+s_B)s_A + f_{Ai}')$, where $f_{Ai}, f_A'$, are error ring elements generated using the Gaussian distribution. Accordingly, partial re-linearization vector $(c_A, d_A) = (a_i, a_i(s_A+s_B)+(e_{Ai}+e_{Bi})+2^{ir}(s_A+s_B)s_A)$. Party A's partial re-linearization vector $(c_A, d_A)$ may correspond to an encryption of $2^{ir}(s_A+s_B)s_A$ under the common public key $pk = a(s_A+s_B)+e_A+e_B$ associated with the common secret key $s=s_A+s_B$ (e.g., removing a factor of $s_A$ from the key).

Party A, party B or another third party may then combine party A and B's partial re-linearization vectors to generate common re-linearization key or matrix $(c, d) = (c_A+c_B, d_A+d_B)$. Re-linearization key $(c, d)$ may correspond to an encryption of $2^{ir}(s_A+s_B)^2$ under the common public key $pk = a(s_A+s_B)+e_A+e_B$ associated with the secret key $s_A+s_B$, which is exactly the common re-linearization key for the common secret key $s=s_A+s_B$. Party A (or another party) may generate and/or send to party B or another party, the re-linearization vector $(c, d)$.

Party B, A or another party may use the common re-linearization key $(c, d)$ to re-encrypt the non-linear result ciphertext $(c_0^*, c_1^*, c_2^*) = c_0^* + sc_1^* + s^2 c_2^*$ of a non-linear computation such as multiplication of two linearly encrypted ciphertexts $(c_0, c_1)$ and $(c_0', c_1')$. The result ciphertext $(c_0^*, c_i^*, c_2^*)$ is encrypted by a non-linear public key, e.g., associated with non-linear secret key $s^2 = (s_A+s_B)^2$. Re-linearization key $(c, d)$ has two terms c and d each of which are vectors of polynomials with respective terms $C_i$ and $D_i$ (e.g., i incrementing through the number of digits). Embodiments of the invention may perform digit decomposition on $c_2^*$ as $Q = \text{digitDecompose}(c_2^*)$, and then compute $c_0^{**} = c_0^* + \Sigma_i C_i Q_i$, $c_1^{**} = c_1^* + \Sigma_i D_i Q_i$. This transforms the non-linear result ciphertext $c_0^* + c_1^*(s_A+s_B) + c_2^*(s_A+s_B)^2$ to a re-encrypted linear result ciphertext $c_0^{} + c_1^{}(s_A+s_B)$. Re-linearization thus subtracts the quadratic $c_2^*$ key term, and projects it onto the linear $c_i^{}$ and constant $c_0^{}$ terms, thus mapping ciphertext $(c_0^*, c_i^*, c_2^*)$ to $(c_0^{}, c_i^{})$. Re-encrypting the result ciphertext by the common re-linearization operator $(c, d)$ thus swaps the result ciphertext's encryption key from the non-linear public key associated with non-linear secret key $(s_A+s_B)^2$ to a linear common public key associated with linear secret key $(s_A+s_B)$, to re-linearize the encryption key of the result ciphertext.

Because the re-encrypted result ciphertext $(c_0^{}, c_i^{})$ is encrypted by the linear common public key associated with linear secret key $s=(s_A+s_B)$, its linear additive decryption property is restored and it may be collaboratively decrypted piecewise by the multiple parties each contributing a partial decryption with their respective secret key share, without exposing the common secret key $(s_A+s_B)$. First, party A computes a partial decryption $d_A = c_0^{} + s_A c_1^{} + e_A$ using its secret key share $s_A$ and party B computes a partial decryption $d_B = c_0^{} + s_B c_1^{} + e_B$ using its secret key share $s_B$, where $e_A$ and $e_B$ are the respective parties' generated error ring elements, to yield a complete decryption of the ciphertext result as $d = d_A + d_B$, i.e., the unencrypted result of the non-linear computation. Because re-linearization eliminates non-linear encryption of the result ciphertext by the public key associated with the non-linear secret key $(s_A+s_B)^2$, the common secret key $(s_A+s_B)$, as a whole, need not be exposed to decrypt the result ciphertext, thus preserving the system's security.

Extension to Multi-Party Scenarios

The above procedure may be extended to any integer number of j=N parties. For three parties, e.g., two extra rounds may be added to compute intermediate sums for common encrypted ciphertext vector b and common re-linearization key $(c, d)$. For N parties (where N≥2), the number of rounds may be 2N−1 if a sequential order of interactions is used.

Fewer rounds may be used if the parties generate their partial encrypted ciphertext vectors $b_j$ and/or partial re-linearization operators $(c_j, d_j)$ in parallel. In some embodiments, a server (or multiple hosts in a hierarchical star topology) may sum up all partial public shares $b_j$ and $(c_j, d_j)$ using a star topology. In this case, the number of rounds may be reduced (e.g., to three if a single central host is used).

Distributed Key Generation for Rotation/Automorphism Evaluation Keys

Embodiments of the invention may provide a distributed evaluation key generation procedure for rotation/automorphism operations. These evaluation keys may be used to perform encrypted rotations and various permutations. Embodiments of the invention derive the distributed key generation protocol for the case of the BV digit decomposition method, but the same procedure may be applied to any other existing key switching technique, e.g., including but not limited to those listed in the "Single-Key Evaluation Key Generation" section.

As above, generating the rotation/automorphism key $(a, b)$ is first described in a system with j=two parties A and B for simplicity, and then generalized to any number of j parties.

Round 0: Parties A and/or B may generate vector a of uniform random elements $a_i$ for $i=0 \ldots \log_r q$, where r is the digit bit size and q is the ciphertext modulus. Parties A and/or B may use a cryptographically secure hash function to generate a.

Round 1—Executed by Party A: Party A samples its secret key share $s_A$, and Gaussian error ring element $e_{Ai}$ for $i=0 \ldots \log_r q$. Party A computes a partial encryption vector $b_A$ with components, e.g., $b_{Ai} = a_i s_A + e_{Ai} + 2^{ir} s_A^{(k)}$ for $i=0 \ldots \log_r q$, where $s_A^{(k)}$ is a k-automorphism of $s_A$ and k is the automorphism index corresponding to the desired rotation/automorphism. Party A may send the partial encryption vector $b_A$ to party B.

Round 2—Executed by Party B: Party B first performs the same steps as party A in Round 1 using its secret key share $s_B$. Party B samples its secret key share $s_B$, and Gaussian error ring element $e_{Bi}$ for $i=0 \ldots \log_r q$. Party B computes a partial encryption vector $b_B$ including e.g., $b_{Ai} = a_i s_B + e_{Bi} + 2^{ir} s_B^{(k)}$ for $i=0 \ldots \log_r q$, where $s_B^{(k)}$ is a k-automorphism of $s_B$ and k is the automorphism index corresponding to the desired rotation/automorphism. Party B, party A or another third party may then combine party A and B's partial encryption vectors to generate a common encrypted vector $b = \Sigma_j b_j = b_A + b_B$ and may send it to party A. Party B, party A or another third party may generate a rotation/automorphism key or matrix $(a, b) = (a, b_A + b_B)$ that represents the encryption of $2^{ir}(s_A^{(k)} + s_B^{(k)})$ under the common secret key $s_A + s_B$, which is exactly the rotation/automorphism evaluation key for a "common" secret key $s=s_A+s_B$ and automorphism index k.

Party B, party A or another third party may re-encrypt a ciphertext with the rotation/automorphism key (a,b) to rotate or permute the ciphertext.

Extension to Multi-Party Scenarios

The above procedure may be extended to any integer number of j=N parties. For three parties, e.g., one extra round may be added to compute intermediate sums for b. For N parties (where N≥2), the number of rounds may be N if a sequential order of interactions is used.

Fewer rounds may be used if the parties generate their partial encrypted vectors $b_j$ in parallel. In some embodiments, a server (or multiple hosts in a hierarchical star topology) may sum up all public shares for b using a star topology. In this case, the number of rounds may be reduced (e.g., to two if a single central host is used).

Distributed Decryption

To decrypt, embodiments of the invention may input a linear ciphertext of the form $(c_0, c_1)=c_0+sc_1+e$ (e.g., the re-linearized multiplication result ciphertext $(c_0^*, c_1^{**})$). First, party A computes its partial decryption $d_A=c_0+s_A c_1+e_A$, where $e_A$ is a generated error ring element. All other j parties compute their respective partial decryptions $d_j=s_j c_1+e_j$. Then all partial decryptions may be added up as $$d = \sum_{j=1}^{N} d_j$$

equal to the fully decrypted result. In some embodiments, a scheme-specific decoding procedure may be applied to d to get the fully decrypted result (e.g., as it is done in the case of single-key FHE).

Homomorphic Encryption Schemes

Embodiments of the invention may be used in conjunction with many homomorphic encryption schemes, including, e.g., BGV, Brakerski/Fan-Vercauteren (BFV), and Cheong-Kim-Kim-Song (CKKS). The algorithms may be based on the hardness of the Ring LWE problem and circular security assumption.

Single-Key Evaluation Key Generation

The evaluation key generation and key switching of a ciphertext in the single-key FHE scenarios of BGV, BFV, and CKKS may be performed using, e.g., any of the following techniques:

Brakerski-Vaikuntanathan (BV) digit decomposition, which may be extended to residue decomposition in RNS;

Gentry-Halevi-Smart (GHS) key switching based on the use of a larger (e.g., roughly double bit size) auxiliary modulus; and/or Hybrid key switching, combining both techniques, which may be implemented in HElib and then extended to residue decomposition.

These three techniques can be applied to BGV, BFV, or CKKS. The choice for a given application may depend on performance and noise requirements.

Distributed Key Generation of a Common Public Key

Some embodiments of the invention provide a distributed common public key generation procedure based on a multi-party extension of the Brakerski-Gentry-Vaikuntanathan (BGV) FHE scheme, using Ring LWE schemes, such as BGV, BFV, and CKKS, instead of an LWE scheme.

Reference is made to FIG. 1, which schematically illustrates a system for secure distributed key generation and collaborative decryption under threshold fully homomorphic encryption with multiple data owners 140, 150, 160, . . . , according to some embodiments of the invention. In FIG. 1, each data owner 140, 150, 160, . . . has its own secret key share $s_j$ (a portion of the full joint public key pk). Data owners 140, 150, 160, . . . collaboratively interact to combine their secret key shares $s_j$ to generate a common public key $pk=s=\Sigma_j s_j$ and associated common evaluation key. One or more data owners 140, 150, 160, . . . encrypt their respective data $D_i$ 180 with the common public key pk and send the encrypted data and associated common evaluation key to a computational host 210. Computational host 210 performs non-linear computations (e.g., multiplication, rotation, automorphisms), using the common evaluation key on the multiple parties' encrypted data $D_i$ 180 to generate a multiparty computational result. In some embodiment, the computational host may re-encrypt a non-linear ciphertext result with a re-linearization key (c,d) to generate a linear ciphertext result that may be collaboratively decrypted by the multiple data owners 140, 150, 160, . . . without exposing the common secret key. Additionally or alternatively, computational host 210 may re-encrypt a ciphertext with the rotation/automorphism key (a,b) to rotate or permute the ciphertext. The re-linearized or rotated/permuted computational result may be collaboratively decrypted by the multiple parties 140, 150, 160, . . . , where each data owner performs its respective partial decryption using its secret key share $s_j$ and the decrypted results are combined to generate the decryption of each party's data $D_i$.

Figure 2:
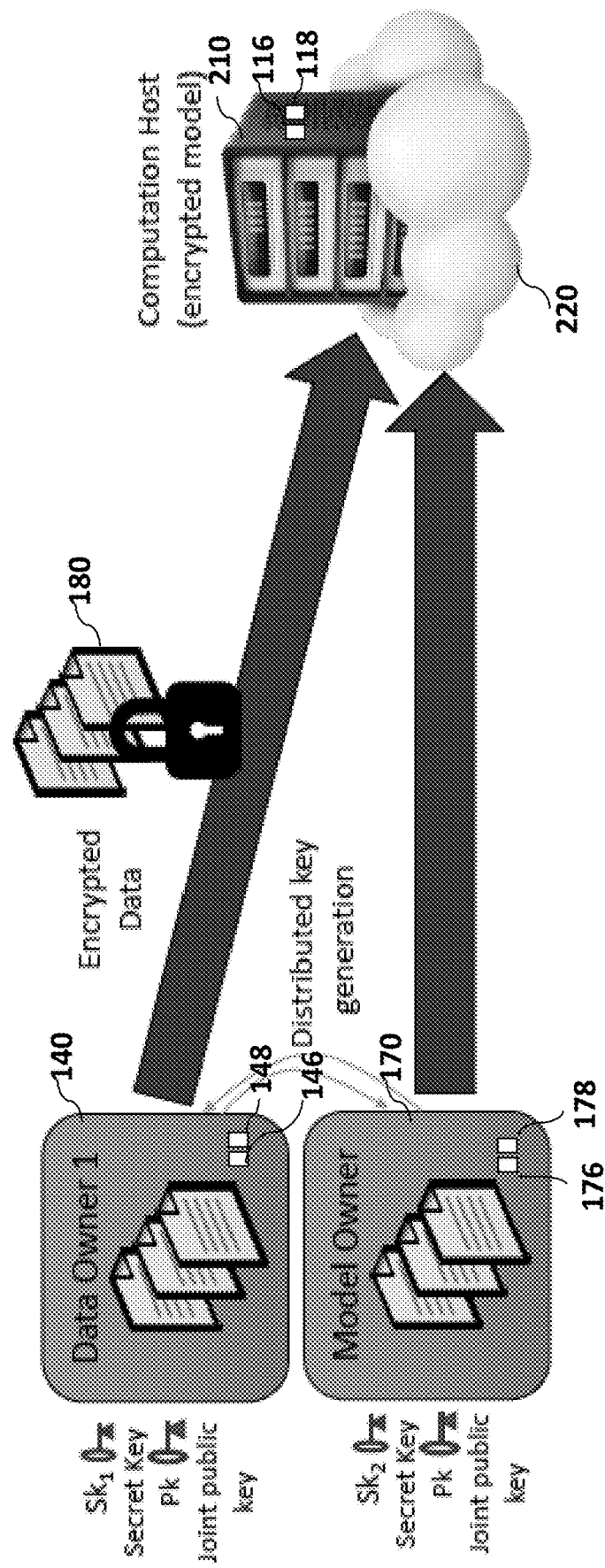
FIG. 2 schematically illustrates a system for secure distributed key generation and collaborative decryption under threshold fully homomorphic encryption with an encrypted model, according to some embodiments of the invention.

Reference is made to FIG. 2, which schematically illustrates a system for secure distributed key generation and collaborative decryption under threshold fully homomorphic encryption with an encrypted model, according to some embodiments of the invention. In FIG. 2, one or more data owner(s) 140 and model owner(s) 170 possesses their own respective secret key share $s_1$ (a portion of the full joint public key pk). The data owner(s) 140 and model owner(s) 170 collaboratively interact to combine their secret key shares $s_j$ to generate a common public key $pk=s=\Sigma_j s_j$ and associated common evaluation key. The data owner(s) 140 encrypt their data $D_1$ with the common public key pk and the model owner(s) 170 encrypt their model $M_i$ with the common public key pk. The data owner(s) and model owner(s) send the HE data and HE model 180 and associated common evaluation key to the computational host 210. Thus, the computational host 210 does not have access to the unencrypted model or computations it performs, only the HE model or computations performed in the HE space. The computational host 210 performs the HE model computations, using the common evaluation key, on the HE data 180, all in HE space, without access to the unencrypted data or model, to generate a multiparty computational result. In some embodiment, the HE computations may include re-encrypting a non-linear ciphertext result with a HE re-linearization key (c,d) to generate a linear ciphertext result that may be collaboratively decrypted by the multiple parties 140 and 170 without exposing the common secret key. Additionally or alternatively, the HE computations may include re-encrypting a ciphertext with a HE rotation/automorphism key (a,b) to rotate or permute the ciphertext. The re-linearized or rotated/permuted result may be collaboratively decrypted by the multiple parties 140 and 170, where the data owner 140 and model owner 170 each performs a partial layer of decryption using its respective secret key share $s_j$ to yield the fully decrypted result.

The systems of FIGS. 1 and 2 may include any integer number of N distributed party devices(s) 140, 150, 160, 170, . . . and/or one or more server(s) 210 (or multiple hosts e.g., in a hierarchical star topology). Any or all of system devices may be connected via one or more network(s) 220.

The data owner(s) and model owner(s) of the systems of FIGS. 1 and 2 may be operated by one or more distributed party devices 140, 150, 160, 170, ... which collectively (but not individually) encrypt and decrypt data.

Distributed party device(s) 140, 150, 160, 170, ... may each generate a public key share, which cannot individually, but can only collectively reconstruct a full public key to encrypt data 180. Distributed party device(s) 140, 150, 160, 170, ... may each provide a partial decryption using their secret key, which may be aggregated at a secure device (e.g., server 210) to decrypt the data.

Server 210 and/or party device(s) 140, 150, 160, 170, ... may include software processes or applications for storing and retrieving data such as computations and/or public key shares. Data may also include code (e.g., software code) or logic, e.g., to enable the application of embodiments of the invention.

Server 210 and/or distributed party device(s) 140, 150, 160, 170, ... may be servers, personal computers, desktop computers, mobile computers, laptop computers, and notebook computers or any other suitable device such as a cellular telephone, personal digital assistant (PDA), video game console, etc., and may include wired or wireless connections or modems.

Network 220, which connects server(s) 210 and/or distributed party device(s) 140, 150, 160, ...., may be any public or private network such as the Internet. Access to network 220 may be through wire line, terrestrial wireless, satellite or other systems well known in the art.

Server(s) 210 and distributed party device(s) 140, 150, 160, 170, ...., may include one or more controller(s) or processor(s) 116, 146, 156, 166, 176, ...., respectively, for executing operations according to embodiments of the invention and one or more memory unit(s) 118, 148, 158, 168, 178, ...., respectively, for storing data (e.g., public key shares, secret keys, partial encrypted data, and/or partial decrypted data) and/or instructions (e.g., software for applying computations or calculations, keys to encrypt and/or decrypt data according to embodiments of the invention) executable by the processor(s). Processor(s), 116, 146, 156, 166, 176, ...., may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 148, 158, 168, 178, ...., may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Figure 3:
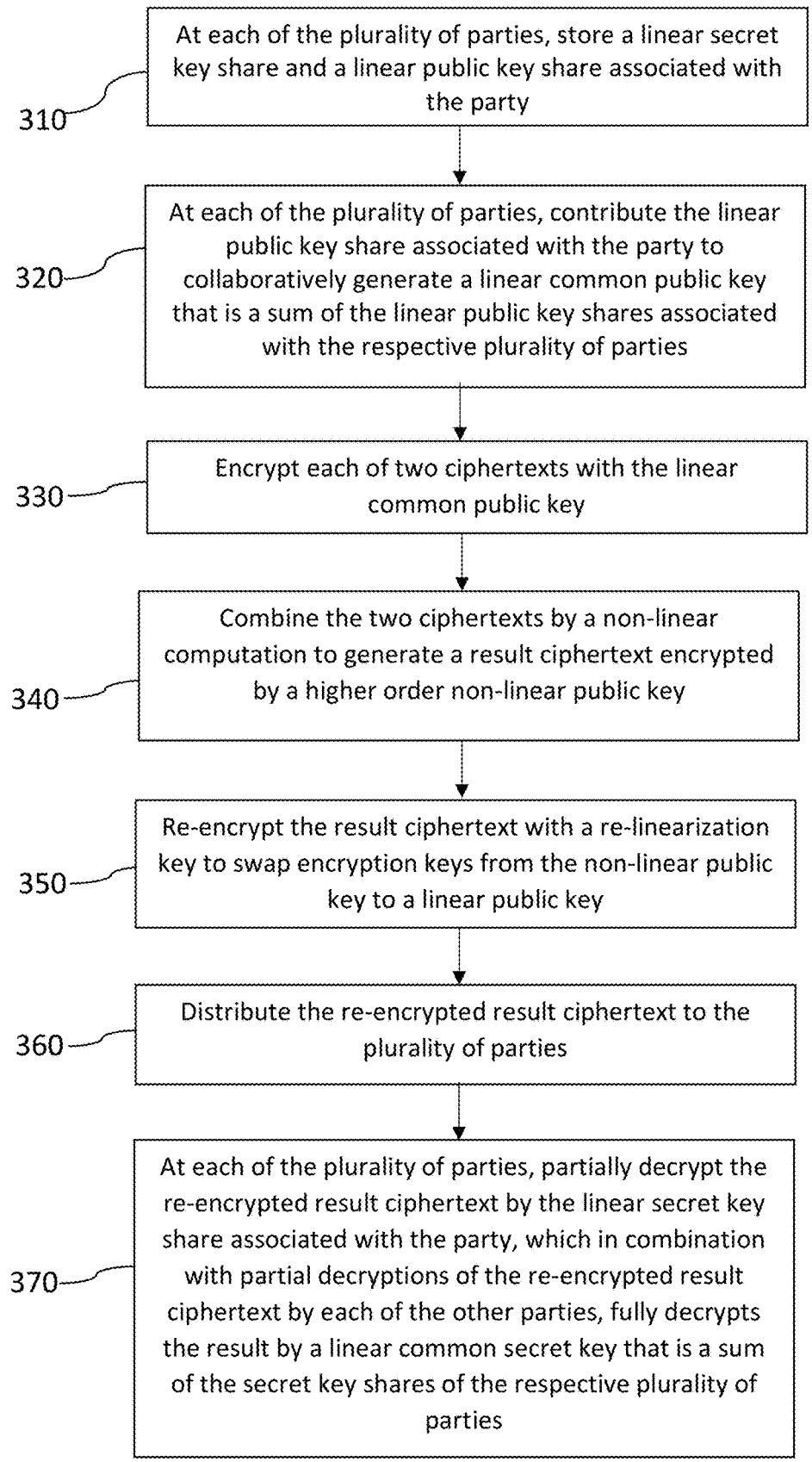
FIG. 3 is a flowchart of a method for secure multiparty homomorphic encryption, according to some embodiments of the invention.

Reference is made to FIG. 3, which is a flowchart of a method for secure multiparty homomorphic encryption, according to some embodiments of the invention. The operation(s) of FIG. 3 may be performed using devices or components disclosed in reference to the systems of FIGS. 1-2. For example, the operation(s) of FIG. 3 may be performed using one or more processors of data owner(s) 140, 150, 160, ...., model owner(s) 170 and/or computational host 210 of FIGS. 1-2 which may be operated by a party A and/or a party B. Other devices or systems may also be used.

In operation 310, at each of a plurality of parties (e.g., 140, 150, 160, and/or 170 of FIGS. 1-2), one or more processors (e.g., 146, 156, 166, 176, ... of FIGS. 1-2) may store in one or more memories (e.g., 148, 158, 168, 178, ... of FIGS. 1-2) a linear secret key share and a linear public key share associated with the party.

In operation 320, at each of the plurality of parties, one or more processors (e.g., 146, 156, 166, 176, ... of FIGS. 1-2) may contribute the linear public key share associated with the party to collaboratively generate a linear common public key that is a sum (e.g., an exact sum or function of the sum) of the linear public key shares associated with the respective plurality of parties. The processors may send, and one or more processors (e.g., 116, 146, 156, 166, and/or 176) may receive the linear common public key.

In operation 330, one or more processors (e.g., 116, 146, 156, 166, and/or 176) may encrypt each of two ciphertexts with the linear common public key.

In operation 340, one or more processors (e.g., 116, 146, 156, 166, and/or 176) may combine the two ciphertexts by a non-linear computation (e.g., a multiplication, automorphism or rotation operation) to generate a result ciphertext encrypted by a higher order non-linear public key.

In operation 350, one or more processors (e.g., 116, 146, 156, 166, and/or 176) may re-encrypt the result ciphertext with a re-linearization key to swap encryption keys from the non-linear public key to a linear public key.

The plurality of parties may collaboratively generate the re-linearization key. At each of the plurality of parties, one or more processors (e.g., 146, 156, 166, 176, ... of FIGS. 1-2) may generate a partial encryption vector $b_j$ that represents a partial encryption of $2^{ir} s_j$ under the party's linear public key share $pk_j$ associated with the party's linear secret key share $s_j$. One or more processors (e.g., 116, 146, 156, 166, and/or 176) may combine one or more of the plurality of partial encryption vectors $b=\Sigma_j b_j$ to generate a common encryption operator (a,b) that represents an encryption of $$2^{ir}\sum_{j=1}^{N} s_j$$

under the linear common public key pk associated with the linear common secret key $$\sum_{j=1}^{N} s_j.$$

At each of the plurality of parties, one or more processors (e.g., 146, 156, 166, 176, ... of FIGS. 1-2) may apply the linear secret key share $s_j$ to the common encryption operator (a,b) to generate a partial re-linearization operators $(c_j,d_j)$ that represents an encryption of $$2^{ir} s_j \sum_{j=1}^{N} s_j$$

under the linear common public key pk associated with the linear common secret key $$\sum_{j=1}^{N} s_j.$$

One or more processors (e.g., 116, 146, 156, 166, and/or 176) may combine one or more of the plurality of partial re-linearization operators $(c_j,d_j)$ to generate a re-linearization key (c,d) that represents encryptions of $$2^{ir}\left(\sum_{j=1}^{N} s_j\right)^2$$

under the linear common public key pk associated with the linear common secret key $$\sum_{j=1}^{N} s_j.$$

Re-encrypting the result ciphertext may comprise swapping encryption keys by composing the re-linearization key with the result ciphertext. Encryption keys may be swapped from the non-linear public key associated a square of the common secret key $$\left(\sum_{j=1}^{N} s_j\right)^2$$

to the linear public key associated with the linear common secret key $$\sum_{j=1}^{N} s_j.$$

In operation 360, one or more processors (e.g., 116, 146, 156, 166, and/or 176) may distribute the re-encrypted result ciphertext to the plurality of parties. If one or more of the parties already possesses the re-encrypted result ciphertext, distributing may include accessing its own data for processing.

In operation 370, at each of the plurality of parties, one or more processors (e.g., 146, 156, 166, 176, . . . ) may partially decrypt the re-encrypted result ciphertext by the linear secret key share associated with the party, which in combination with partial decryptions of the re-encrypted result ciphertext by each of the other parties, fully decrypts the result by a linear common secret key that is a sum of the secret key shares of the respective plurality of parties.

Other or additional operations may be executed in the same or different order.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments. Accordingly, the scope of the invention should not be limited by what has thus far been described, but by the appended claims and their legal equivalents.

The invention claimed is:

1. A method for collaborative multiparty homomorphic encryption, comprising:

receiving a linear common public key that is collaboratively generated by a plurality of parties each party of the plurality of parties contributing a linear public key share associated with the party, which in combination with linear public key shares associated with each of the other parties, generates the linear common public key that is a sum of the linear public key shares associated with the respective plurality of parties;

encrypting each of two ciphertexts with the linear common public key;

combining the two ciphertexts by a non-linear computation to generate a result ciphertext encrypted by a higher order non-linear public key;

re-encrypting the result ciphertext with a re-linearization key to swap encryption keys from the non-linear public key to a linear public key, wherein the re-linearization key represents encryptions of $2^{ir}s^2$ under the linear common public key associated with a linear common secret keys; and distributing the re-encrypted result ciphertext to each of the plurality of parties to each partially decrypt the re-encrypted result ciphertext by a linear secret key share associated with the party, which in combination with partial decryptions of the re-encrypted result ciphertext by each of the other parties, fully decrypts the result by the linear common secret key that is a sum of the secret key shares of the respective plurality of parties.

2. The method of claim 1, wherein the re-linearization key is generated by:

combining one or more of a plurality of partial encryption vectors $b=\Sigma_j b_j$, wherein each partial encryption vector $b_j$ is generated at a jth one of the plurality of N parties and represents a partial encryption of $2^{ir}s_j$ under the party's linear public key share $pk_j$ associated with the party's linear secret key share $s_j$;

generating a common encryption operator (a,b) that is based on the combined partial encryption vectors b and represents an encryption of $$2^{ir}\sum_{j=1}^{N}s_j$$

under the linear common public key pk associated with the linear common secret key $$\sum_{j=1}^{N}s_j;$$

and combining one or more of a plurality of partial re-linearization operators ($c_j$, $d_j$) to generate a re-linearization key (c,d), wherein each of the plurality of partial re-linearization operators ($c_j$, $d_j$) is generated by each j of the plurality of N parties applying the linear secret key share $s_j$ to the common encryption operator (a,b), wherein each of the plurality of partial re-linearization operators ($c_j$, $d_j$) represents an encryption of $$2^{ir}s_j\sum_{j=1}^{N}s_j$$

under the linear common public key pk associated with the linear common secret key $$\sum_{j=1}^{N}s_j$$

to generate re-linearization key (c,d) that represents encryptions of $$2^{ir}\left(\sum_{j=1}^{N}s_j\right)^2$$

under the linear common public key pk associated with the linear common secret key $$\sum_{j=1}^{N}s_j.$$

3. The method of claim 1, wherein re-encrypting the result ciphertext comprises swapping encryption keys by composing the re-linearization key with the result ciphertext.

4. The method of claim 1 comprising swapping encryption keys from the non-linear public key associated a square of the common secret key $$\left(\sum_{j=1}^{N}s_j\right)^2$$

to the linear public key associated with the linear common secret key $$\sum_{j=1}^{N}s_j.$$

5. The method of claim 1, wherein the non-linear computation is based on a multiplication, automorphism or rotation operation.

6. The method of claim 1, wherein the encryption protocol is Threshold Fully Homomorphic Encryption (FHE).

7. The method of claim 1, wherein the encryption scheme is selected from the group consisting of: Brakerski-Gentry-Vaikuntanathan (BGV), Brakerski/Fan-Vercauteren (BFV), and Cheong-Kim-Kim-Song (CKKS).

8. A system for collaborative multiparty homomorphic encryption, comprising: one or more microprocessors configured to: receive a linear common public key that is collaboratively generated by a plurality of parties each contributing a linear public key share associated with the party, which in combination with linear public key shares associated with each of the other parties, generates the linear common public key that is a sum of the linear public key shares associated with the respective plurality of parties, encrypt each of two ciphertexts with the linear common public key, combine the two ciphertexts by a non-linear computation to generate a result ciphertext encrypted by a higher order non-linear public key, re-encrypt the result ciphertext with a re-linearization key to swap encryption keys from the non-linear public key to a linear public key, wherein the re-linearization key represents encryptions of $2^{ir}s^2$ under the linear common public key associated with a linear common secret key s, and distribute the re-encrypted result ciphertext to the plurality of parties to each partially decrypt the re-encrypted result ciphertext by a linear secret key share associated with the party, which in combination with partial decryptions of the re-encrypted result ciphertext by each of the other parties, fully decrypts the result by the linear common secret key that is a sum of the secret key shares of the respective plurality of parties.

9. The system of claim 8, wherein one or more microprocessors are configured to: combine one or more of a plurality of partial encryption vectors b=$\Sigma_j b_j$, wherein each partial encryption vector $b_j$ is generated at a jth one of the plurality of N parties and represents a partial encryption of $2^{ir}s_j$ under the party's linear public key share $pk_j$ associated with the party's linear secret key share $s_j$, generate a common encryption operator (a,b) that is based on the combined partial encryption vectors b and represents an encryption of $2^{ir}\Sigma s_j$ under the linear common public key pk associated with the linear common secret key $\Sigma s_j$, and combine one or more of a plurality of partial re-linearization operators ($c_j$,$d_j$) to generate a re-linearization key (c,d), wherein each of the plurality of partial re-linearization operators ($c_j$,$d_j$) is generated by each j of the plurality of N parties applying the linear secret key share $s_j$ to the common encryption operator (a,b), wherein each of the plurality of partial re-linearization operators ($c_j$,$d_j$) represents an encryption of $2^{ir}\Sigma s_j$ under the linear common public key pk associated with the linear common secret key $\Sigma s_j$; to generate the re-linearization key (c,d) represents encryptions of $2^{ir}(\Sigma s_j)^2$ under the linear common public key pk associated with the linear common secret key $\Sigma s_j$.

10. The system of claim 8, wherein the one of more microprocessors are configured to re-encrypt the result ciphertext comprises swapping encryption keys by composing the re-linearization key with the result ciphertext.

11. The system of claim 8, wherein the one of more microprocessors are configured to swap encryption keys from the non-linear public key associated a square of the common secret key $(\Sigma s_j)^2$ to the linear public key associated with the linear common secret key $\Sigma s_j$.

12. The system of claim 8, wherein the non-linear computation is based on a multiplication, automorphism or rotation operation.

13. The system of claim 8, wherein the encryption protocol is Threshold Fully Homomorphic Encryption (FHE).

14. The system of claim 8, wherein the encryption scheme is selected from the group consisting of: Brakerski-Gentry-Vaikuntanathan (BGV), Brakerski/Fan-Vercauteren (BFV), and Cheong-Kim-Kim-Song (CKKS).

15. A non-transitory computer readable storage medium for collaborative homomorphic encryption by a plurality of parties, the computer readable storage medium having instructions stored thereon, which when executed by one or more processors, cause the processors to:
   receive a linear common public key that is collaboratively generated by the plurality of parties each party of the plurality of parties contributing a linear public key share associated with the party, which in combination with linear public key shares associated with each of the other parties, generates the linear common public key that is a sum of the linear public key shares associated with the respective plurality of parties;
   encrypt each of two ciphertexts with the linear common public key;
   combine the two ciphertexts by a non-linear computation to generate a result ciphertext encrypted by a higher order non-linear public key;
   re-encrypt the result ciphertext with a re-linearization key to swap encryption keys from the non-linear public key to a linear public key, wherein the re-linearization key represents encryptions of $2^{ir}s^2$ under the linear common public key associated with a linear common secret keys; and
   distribute the re-encrypted result ciphertext to each of the plurality of parties to each partially decrypt the re-encrypted result ciphertext by the linear secret key share associated with the party, which in combination with partial decryptions of the re-encrypted result ciphertext by each of the other parties, fully decrypts the result by the linear common secret key that is a sum of the secret key shares of the respective plurality of parties.

16. The non-transitory computer readable storage medium of claim 15 having further instructions stored thereon, which when executed by the one or more processors, cause the processors to generate the re-linearization key by:
   combining one or more of a plurality of partial encryption vectors $b=\Sigma_j b_j$, wherein each partial encryption vector $b_j$ is generated at a jth one of the plurality of N parties and represents a partial encryption of $2^{irl\ s}_j$ under the party's linear public key share $pk_j$ associated with the party's linear secret key share $s_j$;
   generating a common encryption operator (a,b) that is based on the combined partial encryption vectors b and represents an encryption of $$2^{ir}\sum_{j=1}^{N}s_j$$

under the linear common public key pk associated with the linear common secret key $$\sum_{j=1}^{N}s_j;$$

and
   combining one or more of a plurality of partial re-linearization operators $(c_j, d_j)$ to generate a re-linearization key (c,d), wherein each of the plurality of partial re-linearization operators $(c_j, d_j)$ is generated by each j of the plurality of N parties applying the linear secret key share $s_j$ to the common encryption operator (a,b), wherein each of the plurality of partial re-linearization operators $(c_j, d_j)$ represents an encryption of $$2^{ir}s_j\sum_{j=1}^{N}s_j$$

under the linear common public key pk associated with the linear common secret key $$\sum_{j=1}^{N}s_j$$

to generate the re-linearization key (c,d) that represents encryptions of $$2^{ir}\left(\sum_{j=1}^{N}s_j\right)^2$$

under the linear common public key pk associated with the linear common secret key $$\sum_{j=1}^{N}s_j.$$

17. The non-transitory computer readable storage medium of claim 15 having further instructions stored thereon, which when executed by the one or more processors, cause the processors to re-encrypt the result ciphertext comprising swapping encryption keys by composing the re-linearization key with the result ciphertext.

18. The non-transitory computer readable storage medium of claim 15 having further instructions stored thereon, which when executed by the one or more processors, cause the processors to swap encryption keys from the non-linear public key associated a square of the common secret key $$\left(\sum_{j=1}^{N}s_j\right)^2$$

to the linear public key associated with the linear common secret key $$\sum_{j=1}^{N}s_j.$$

19. The non-transitory computer readable storage medium of claim 15, wherein the non-linear computation is based on a multiplication, automorphism or rotation operation.

20. The non-transitory computer readable storage medium of claim 15, wherein the encryption protocol is Threshold Fully Homomorphic Encryption (FHE).

* * * * *